(12) United States Patent
De La Cruz et al.

(10) Patent No.: US 9,756,303 B1
(45) Date of Patent: Sep. 5, 2017

(54) CAMERA-ASSISTED AUTOMATIC SCREEN FITTING

(71) Applicant: Texas Instruments Incorporated, Dallas, TX (US)

(72) Inventors: Jaime R. De La Cruz, Carrollton, TX (US); Jeffrey Mathew Kempf, Dallas, TX (US); Ramzansaheb Nadaf, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/396,333

(22) Filed: Dec. 30, 2016

(51) Int. Cl.
*H04N 9/31* (2006.01)
(52) U.S. Cl.
CPC .................................. *H04N 9/3185* (2013.01)
(58) Field of Classification Search
CPC .. H04N 9/3185; H04N 9/3194; H04N 9/3182; H04N 9/3176; H04N 9/31; G06T 3/0093; G06T 19/00; G06T 19/006
USPC ............ 348/744–747, 806, 807; 353/69, 70; 382/275, 276, 293
See application file for complete search history.

(56) References Cited

U.S. PATENT DOCUMENTS

| | | |
|---|---|---|
| 7,379,619 B2 | 5/2008 | Ikeda et al. |
| 2006/0203207 A1 | 9/2006 | Ikeda et al. |
| 2017/0039765 A1* | 2/2017 | Zhou ..................... G06T 19/006 |

* cited by examiner

*Primary Examiner* — Sherrie Hsia
(74) *Attorney, Agent, or Firm* — Michael A. Davis, Jr.; Charles A. Brill; Frank D. Cimino

(57) ABSTRACT

In described examples, solid field patterns are projected onto screens via at least one projector. The screens include user-defined sub-screens. The projected solid field patterns are image captured as imaged solid patterns via at least one camera. For camera perspective planes of the at least one camera, first corner coordinates of the sub-screens are determined, based on differences in pixel values of the imaged solid patterns. Homography matrices are associated with the camera perspective planes and associated with projector perspective planes of the at least one projector. For the projector perspective planes, the first corner coordinates are transformed to second corner coordinates of the sub-screens, based on the homography matrices. Images are projected based on the second corner coordinates.

20 Claims, 9 Drawing Sheets

CAMERA-ASSISTED AUTOMATIC SCREEN FITTING

BACKGROUND

When a projector is positioned, if an optical axis extending through the projector's lens is not orthogonal to a projection screen, then keystone distortion occurs. The keystone distortion can be one-dimensional (e.g., vertical or horizontal offset) or two-dimensional (e.g., vertical and horizontal offset). Keystone distortion occurs when: (a) a projected image plane is not parallel to the screen plane; and (b) the optical axis is not orthogonal to the screen plane. If keystone distortion is readily detected by humans, then it can detract from apparent quality of the projected image.

SUMMARY

In described examples, solid field patterns are projected onto screens via at least one projector. The screens include user-defined sub-screens. The projected solid field patterns are image captured as imaged solid patterns via at least one camera. For camera perspective planes of the at least one camera, first corner coordinates of the sub-screens are determined, based on differences in pixel values of the imaged solid patterns. Homography matrices are associated with the camera perspective planes and associated with projector perspective planes of the at least one projector. For the projector perspective planes, the first corner coordinates are transformed to second corner coordinates of the sub-screens, based on the homography matrices. Images are projected based on the second corner coordinates.

DETAILED DESCRIPTION

In this description, if a first device couples to a second device, that connection can be made through a direct electrical connection, or through an indirect electrical connection via other devices and connections. The term "portion" can mean an entire portion or a portion that is less than the entire portion. The terms "angles" and "coordinates" can overlap in meaning when geometric principles can be used to convert (or estimate) values or relationships therebetween.

Many solutions for screen fitting of "keystoned" images include a trial-and-error process in which the (e.g., non-orthogonal) corners of a to-be-fitted projected image are iteratively adjusted and or estimated by a user until the to-be-fitted projected image is within a selected screen bounds. Other various camera-assisted solutions use beforehand system geometry information (e.g., estimations that are gradually improved by iterating through a calibration process) to determine the relative screen offset angles before automatically adjusting the corners of a to-be-fitted projected image.

A planar homography transformative process for camera-assisted screen fitting is described hereinbelow. The described process for camera-assisted screen fitting implicitly corrects for (e.g., incidental) keystoning when fitting the projected image to a target sub-screen. Also, the perspective transformations between the camera and the projector are analytically based (e.g., rather than numerically processed in response to user estimations and measurements), which increases the accuracy of results determined for a particular system geometry and reduces the iterations otherwise performed for obtaining satisfactory results. Iterative (and time-consuming) user-assisted calibration routines can be avoided because system geometry (such as relative screen offset angles) are implicitly determined by planar homographic transformations performed in response to camera-provided input (e.g., which reduces or eliminates user intervention otherwise involved). Costs in production lines are reduced because units (e.g., projection-based television consoles) are self-correcting when fitting a projected image to a user-defined screen, which reduces user intervention otherwise used in determining the system geometry for keystone corrections. Also, example embodiments can use relatively low resolution cameras (e.g., for capturing projected image screen angles and/or dimensions), which also lowers costs.

Figure 1:
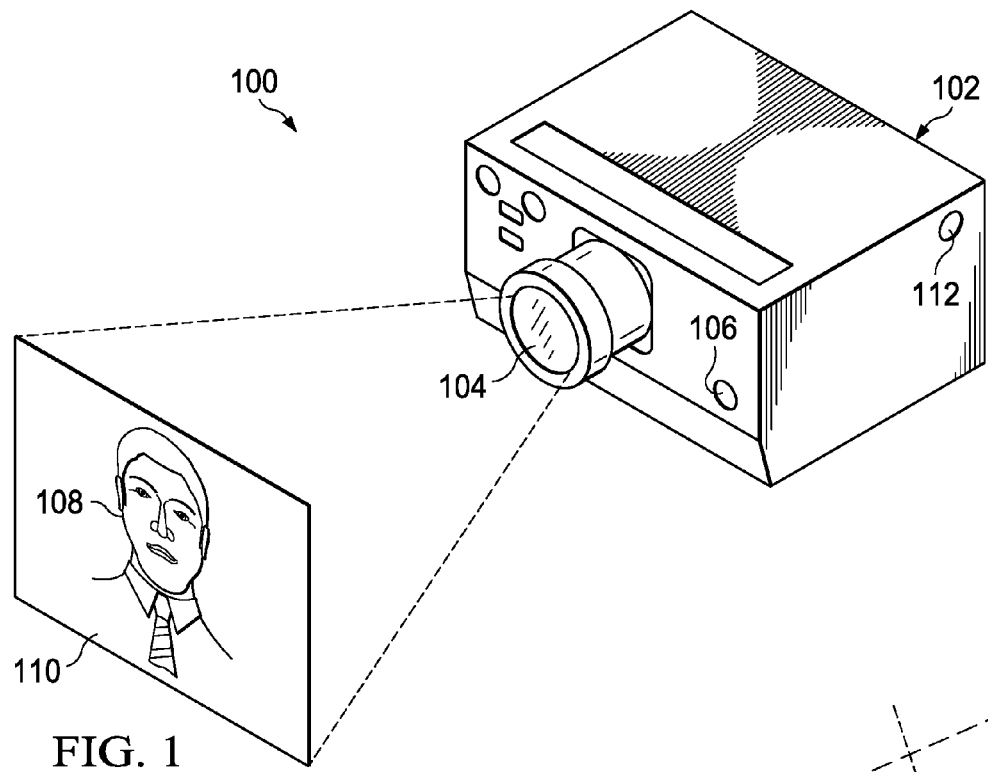
FIG. 1 is a perspective view of a projector having a camera attached thereto in accordance with example embodiments.

FIG. 1 is a perspective view of a projector having a camera attached thereto in accordance with example embodiments. For example, the optical projection system 100 includes a projector 102 for projecting an image 108 onto a screen 110 through a projection lens 104. The image 108 can be a slideshow presentation or video. A camera or image capture device 106, such as a charge-coupled device (CCD) camera or a complementary metal oxide semiconductor (CMOS) image sensor is included in the system 100. In at least one embodiment, the image capture device 106 is embedded within projector 102. In at least one embodiment, the image capture device 106 is a CCD camera 106, which is integrated into the projector 102 for capturing a projected image 108 in a front projection system 100. The image capture device 106 can include a small lens or operate in accordance with pinhole imaging via a small hole in the projector 102, which is outside the circumference of the existing projection lens 104. System 100 includes one or more control buttons 112 to allow menu selections by a user.

Figure 2:
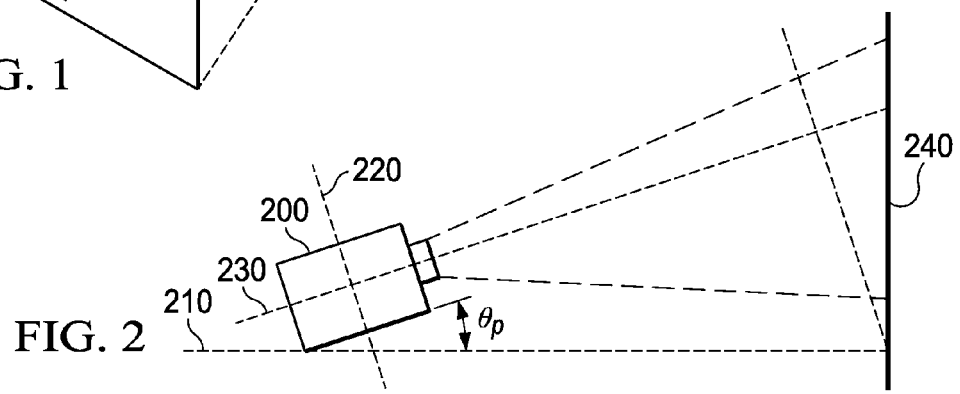
FIG. 2 is a side perspective view of a system geometry of a projector and a screen for displaying an image thereupon in accordance with example embodiments.

FIG. 2 is a side perspective view of a system geometry of a projector and a screen for displaying an image thereupon in accordance with example embodiments. For example, a projector 200 (such as projector 102) is tilted (e.g., upwards) by an angle $\theta_p$ from a horizontal reference plane 210. Accordingly, an angle complementary to angle $\theta_p$ is formed by the projector vertical axis 220 with respect to the horizontal reference plane 210. The projector 200 is arranged to project an image in accordance with an image plane orthogonal to the longitudinal axis 230, which is tilted by angle $\theta_p$ from the horizontal reference plane 210. Vertical keystoning occurs when the pitch offset angle $\theta_p$ is greater than zero.

Figure 3:
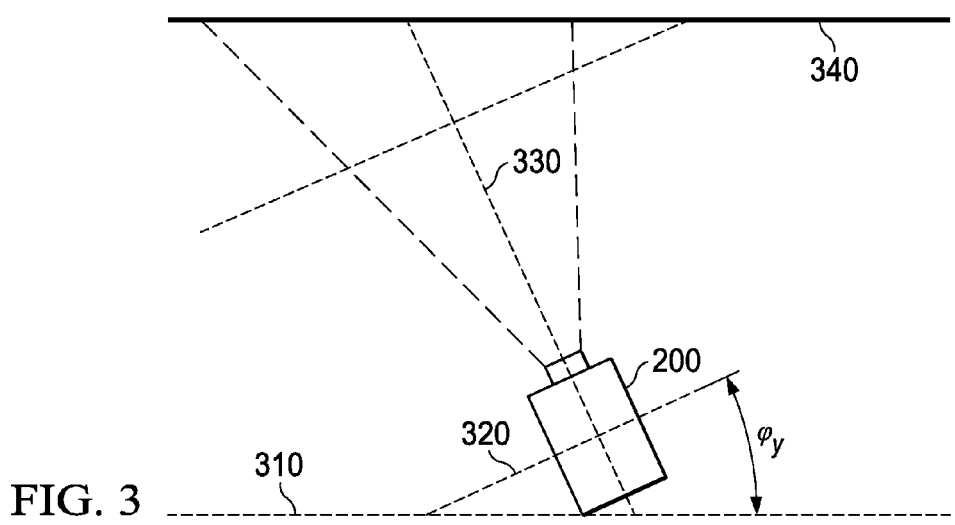
FIG. 3 is a top perspective view of a system geometry of a projector and a screen for displaying an image thereupon in accordance with example embodiments.

FIG. 3 is a top perspective view of a system geometry of a projector and a screen for displaying an image thereupon in accordance with example embodiments. For example, the projector 200 is tilted (e.g., sideways) by an angle $\phi_y$ from a vertical reference plane 310. The angle $\phi_y$ is formed by the projector horizontal axis 320 with respect to the vertical reference plane 310. The projector 200 is arranged to project an image in accordance with an image plane orthogonal to the longitudinal axis 330, which is tilted by the complement of angle $\phi_y$ (e.g., 90°-$\phi_y$) from the vertical reference plane 310. Horizontal keystoning occurs when the yaw offset angle $\phi_y$ is greater than zero.

Figure 4:
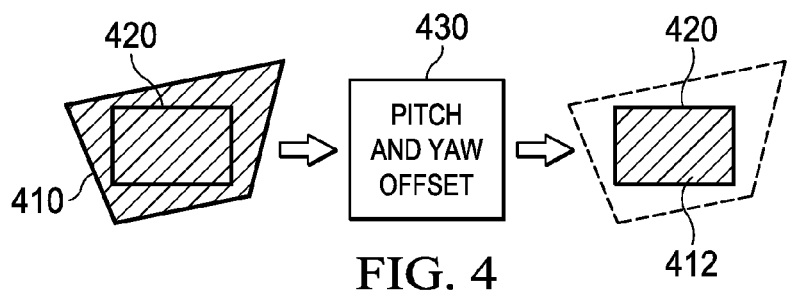
FIG. 4 is a process flow diagram of automatic pitch and yaw offset correction of an irregular displayed image in accordance with example embodiments.

FIG. 4 is a process flow diagram of automatic pitch and yaw offset correction of an irregular displayed image in accordance with example embodiments. For example, when a projection system geometry (e.g., setup) includes both pitch and yaw offset angles, two-dimensional keystone distortion causes the projected input image 410 to be deformed into an irregular quadrilateral (e.g., irregular trapezoid) from the point of view of a user perpendicular to the user-defined screen 420.

Pitch and yaw offset 430 correction is performed in accordance with planar homography transformations described hereinbelow. For example, the pitch and yaw offset 430 correction determines the offset from each of the four corners of the projected input image 410 to the respective corner of the (e.g., rectangular) user-defined screen 420. The determined rectilinear corner offsets (e.g., for each of the "four corners") are used to transform (e.g., scale and/or warp) the input image to a projected transformed image 412 (e.g., such that the four corners of the projected image are aligned with the four corners of a user-defined screen).

In an embodiment, the described planar homography transformations reduce (or eliminate) iterations of an iterative process in which the corners of the projected image are adjusted one by one by the user until the projected image is fitted within the bounds of the sub-screen. The iterative process is further complicated when the projector optical axis is not perpendicular to the projection surfaces (e.g., when keystone distortion exists), because linear changes in the projected image are no longer perceived by a user as being linear when the image is projected. The described planar homography transformations determines the four corners in response to camera input of the displayed image and a determined sub-screen, which reduces iterations of the process, calibration time and errors compounding of errors due to user misjudgment of system geometry.

The sub-screen can be a user-defined screen, which is a portion of an area otherwise within a larger screen. The surface (e.g., plane) of the sub-screen can have a different system geometry (different angles and or distance) from the system geometry in accordance with the larger screen. For example, when projecting an image on the face of building having differently angled surfaces (and/or surfaces having different distances) to a projector system including multiple projectors, each of the different surfaces can be defined as an independent sub-screen, with different projectors assigned to project an the associated sub-screen such that an corrected image can be seamlessly displayed across two-adjacent sub-screens (or across a boundary between a sub-screen and a surrounding or adjacent screen thereto).

Figure 5:
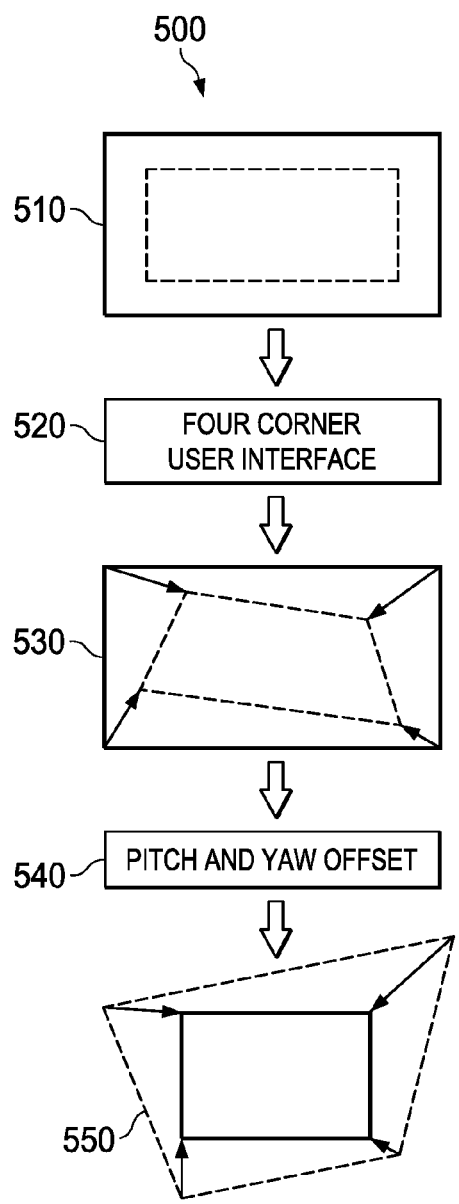
FIG. 5 is a process diagram of elements of four corner correction of an irregular displayed image in accordance with example embodiments.

FIG. 5 is a process diagram of elements of four corner correction of an irregular displayed image in accordance with example embodiments. For example, element 510 is a representation of an ideal (e.g., before projection) image and sub-screen (where the image outline is a rectangular quadrilateral). When the projected image does not appear to be ideal, a user can elect a four-corner correction via a "four-corner" user interface 520 (which can include a displayed menu option or a control button 112 for initiating the four-corner correction). Element 530 is a representation of a planar offset from each corner of the sub-screen with a respective corner of the (e.g., irregular) quadrilateral outline of the displayed image as determined by the four-corner correction process. A pitch and yaw offset engine 540 receives the user-supplied information for describing a system geometric of the projector and sub-screen and transforms the input information into a rectangular quadrilateral having "four corners," where each corner has coordinates determined for scaling and/or warping (e.g., for keystone correcting) the image before projection. The element 550 is a representation of the projection of the transformed image, which appears as a rectangular quadrilateral (e.g., after being corrected for two-dimensional keystoning).

The pitch and yaw offset engine 540 is an application-specific integrated circuit (ASICs) arranged in cooperation with a processor as a special-purpose machine for determining the four corners of a rectangular quadrilateral for two-dimensional keystone distortion for real-time projection of video content. In an angle-based example, a user can provide the pitch and yaw offset engine 540 with user-input information. The user-supplied information can include: approximate pitch and yaw angles; and the projection system optical parameters, such as the throw ratio, vertical offset and image resolution with respect to a target sub-screen. The pitch and yaw offset engine 540 can transform the angle-based information to determine planar offset coordinates for each corner of the sub-screen (e.g., in a rectangular coordinate system). In a user-supplied information example, the pitch and yaw offset engine 540 receives from a user the (e.g., user-estimated) angular or rectangular coordinates of the sub-screen and transforms the coordinate-based information of the sub-screen information to determine planar offsets for each corner of the sub-screen.

In both examples (from the angle-based example and/or the rectangular coordinate-based example), the determined planar offsets for each corner of the sub-screen can be projected as points and compared against an image captured by the projector camera. The pitch and yaw offset engine 540 optionally uses the user-supplied information as hints, such as to determine the location of the sub-screen in an image captured by the projector camera. Accordingly, analytic information derived from the projector camera can enhance the accuracy of user-supplied information, and, user-supplied information can enhance the accuracy of analytic information (e.g., such as when the sub-screen—or displayed points on the sub-screen—cannot be clearly identified by the pitch and yaw offset engine 540). (A description of sub-screen identification is given below with respect to FIG. 11.)

The planar offsets for each of the four corners of the sub-screen are then passed to the (e.g., ASIC-implemented) two-dimensional correction engine so that the input image/video can be scaled before being projected (e.g., to correct for keystoning for each frame of video stream for projection in real-time). The keystone corrected image is transformed (e.g., corrected) in such a way that when projected onto a screen, a rectangular image with the appropriate aspect ratio can be perceived by a viewer in a position perpendicular to the projection screen.

Figure 6:
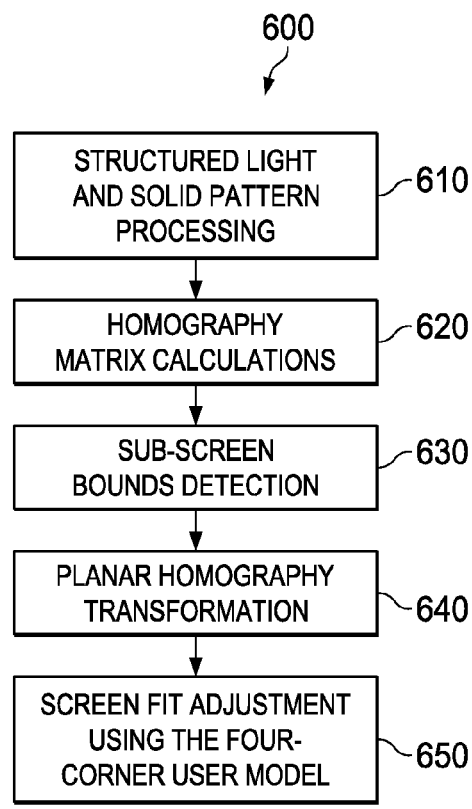
FIG. 6 is a flowchart of a process for camera-assisted planar homography transformation of sub-screen coordinates in accordance with example embodiments.

FIG. 6 is a flowchart of a process for camera-assisted planar homography transformation of sub-screen coordinates in accordance with example embodiments. In various examples, camera-assisted planar homography transformation includes automatic screen fitting in response to a captured image generated by a digital camera in accordance with planar homography. In the example of flow 600: a sequence of patterns (e.g., structured light and solid field patterns) are projected onto a user-defined sub-screen and the projected image is captured by the digital camera and stored in memory in operation 610; the homography matrix between the projector and camera image planes is calculated in operation 620; the bounds of the sub-screen are identified in operation 630, the identified bounds of the sub-screen are transformed in accordance with planar homography in operation 640; and the projected image is transformed (e.g., scaled) using the four-corner user model of the two-dimensional correction engine in operation 650.

Generally, the processes of flow 600 can be implemented using hardware and/or processor(s) to reduce setup times and to improve the accuracy of transforming display coordinates in operation as discussed hereinbelow: the structured light and solid field pattern projection, capture and storage is discussed with respect to FIGS. 6-9; the homography matrix between the projector and camera image planes is discussed with respect to FIG. 10 and Eqs. 1-23; sub-screen boundary identification is discussed with respect to FIGS. 11-16 and Eqs. 24-34, the planar homography transformation of the identified sub-screen boundaries is discussed with respect to Eqs. 35-46; and the projected image is transformed (e.g., scaled) using the four-corner user model of the two-dimensional correction engine is discussed with respect to FIGS. 17-18.

In operation 610, structured light patterns are projected, captured by the digital camera and processed. Structured light patterns are used to establish a correlation between the camera and the projector. The correlation between the camera and the projector is represented in the form of a homography matrix for determining in which positions of the centroids (discussed hereinbelow) of the structured light pattern elements are located in both projected and captured images.

Structured light patterns are used in operation 610 because the structured light patterns allow for an easy and efficient correlation between projected and camera-captured images. As introduced above, projected-captured image correspondence is established for a relatively few points (e.g., such that costs associated with establishing one-to-one correspondence between projected points and captured points are avoided). Accordingly, structured light patterns with sparse elements (e.g., two dimensional Gaussian patterns or circles) provide a fast and efficient way to establish the correspondence. Also, given the expected light ambient conditions for a projector (e.g., from dark to medium illumination), bright elements in the patterns can be easily identified and noise reduced (e.g., because more noise is encountered in images captured in darker lighting conditions).

As described herein, the positions of the elements in the projected structured light pattern are selected, such as to ensure that a substantial portion (e.g., most) of the projected image space is covered by the projected structured light pattern. Covering a substantial portion of the projected image space with a structured light pattern provides hints for recovering increased-resolution spatial information from the projection screen via the camera-captured image. The coordinate position (e.g., in x, y coordinates) of the centroid of a displayed element in the camera captured image is determined by using a single-pass connected component analysis (single-pass CCA) algorithm. The single-pass CCA is a clustering algorithm for searching for connected components with intensities above a predetermined threshold value, which tends to discards low intensity noise. The clusters of connected elements are assigned local identifiers or tags and their centers of mass (or centroids) and relative areas are calculated. After the entire captured image has been analyzed and the detected connected component clusters identified and tagged, the connected components are sorted in descending order based on their relative area. For a camera-captured image in which N elements are expected, the first N elements are considered in area-based descending order; the remaining connected element clusters—in case they exist—are considered noise and discarded. The largest and brightest elements in the camera are assumed to be structured light pattern elements, whereas the smaller bright elements are considered to be noise and discarded. Various embodiments can use algorithms passing through information in a captured image twice, but such two-pass algorithms often consume considerable amounts of memory and processing power. The single-pass CCA algorithm is arranged to retrieve the camera-captured image from the embedded ASIC memory in one pass, and to analyze the retrieved image line by line. The one-pass architecture improves the algorithm execution speed without sacrificing robustness.

Each detected element (e.g., of each of the N structured light pattern elements) in the projected image is assigned an index number, ranging from 0 to N−1, with each respective center-of-mass/centroids stored in ASIC memory. When the positions of the intersections of the otherwise displayed elements is known (e.g., beforehand by a user), analysis of the projected image by the single-pass CCA algorithm is not performed, which saves power and decreases operating time. In a similar manner as performed in analyzing a projected image, an index number (e.g., 0 to N−1) is assigned to each intersection of the known element and each corresponding centroid stored in memory. The indices of the camera-captured centroids are matched in a one-to-one correspondence to the corresponding centroids in the to-be-projected image. Matching the camera-captured centroids to the corresponding projected centroids establishes a one-to-one centroids relationship, which is useful to establish the homography of the camera-captured image to the to-be-projected image.

The index matching process is geometrically based, that is, the camera-captured image frame is divided in quadrants, such that a single quadrant is allocated for each of the centroids. The index matching process is repeated in the to-be-projected image (e.g., such that the centroids of the captured image can be one-to-one associated with the projected image). Each centroid/quadrant in the camera-captured image is matched to the respective centroid/quadrant in the to-be-projected image. Generally, example embodiments assume that relative positions of the camera-captured centroids are discernable by the CCA algorithm (e.g., even when the relative positions of the centroids are distorted to some degree between the centroids in the camera-captured image and the centroids in the to-be-projected image).

Figure 7:
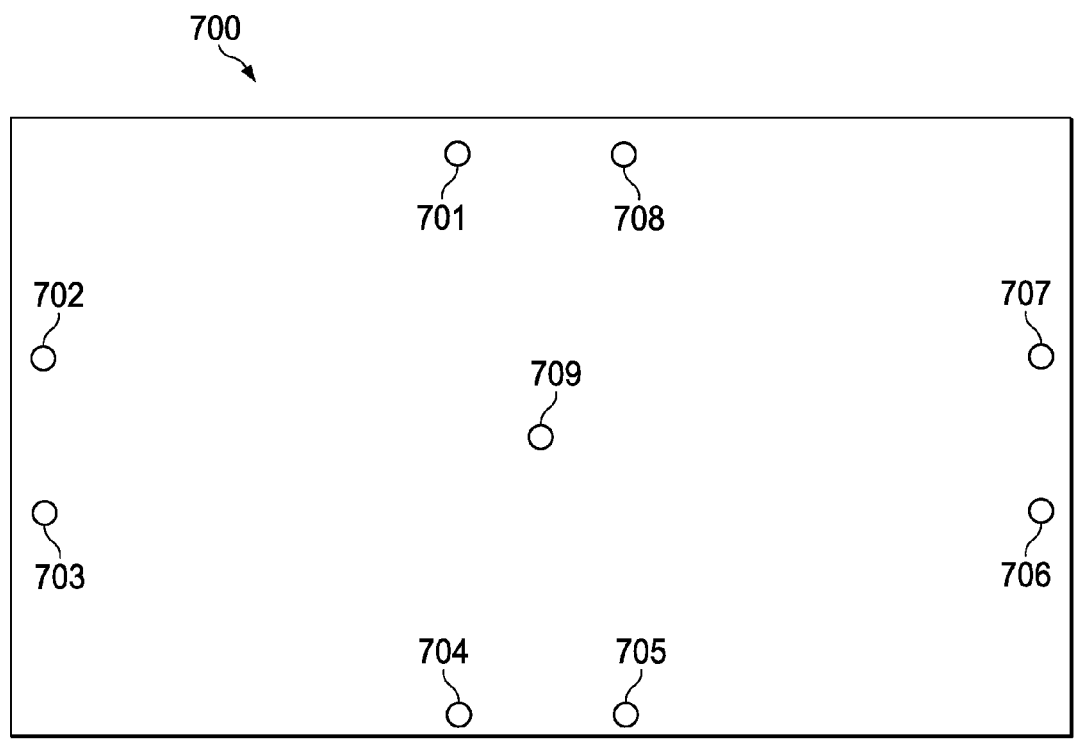
FIG. 7 is a diagram of a projected structured light pattern for camera-assisted planar homography transformation in accordance with example embodiments.

FIG. 7 is a diagram of a projected structured light pattern for camera-assisted planar homography transformation in accordance with example embodiments. For example, pattern 700 includes nine elements (701, 702, 703, 704, 705, 706, 707, 708, and 709) where each of the nine elements is a two-dimensional (2-D) Gaussian function. Eight of the elements are arranged as pairs (e.g., pair 701 and 702, pair 703 and 704, pair 705 and 706, and pair 707 and 708) in each of four quadrants, and one element (709) is centrally arranged in pattern 700. Each element (in accordance with the selected Gaussian function) includes a bell-shaped function of tones (e.g., shades of grey) with the lightest pixel(s) displayed at a centroid of the element and with progressively darker pixels extending outwards two-dimensionally in the plane of the pattern. For at least for the purpose of reproducibility of FIG. 7, the elements of pattern 700 are represented in negative form (where the centroids are inverted in shade as "dark" and the pattern background is inverted in shade as "white"). Pattern 700 is provided as a frame for a to-be-projected (projected) image for projection in a camera-assisted automatic screen fitting process. The position (x, y) of the centroids is precisely determined (and stored as a vector array for a subsequent comparison operation) in accordance with the 2-D Gaussian function used to generate the pattern.

Figure 8:
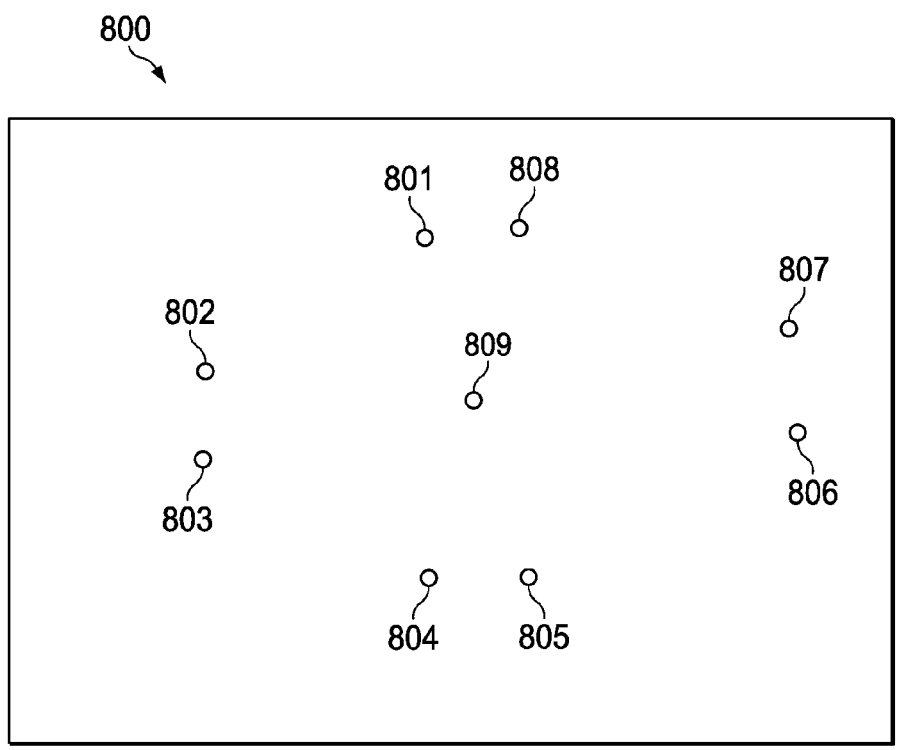
FIG. 8 is a diagram of a captured structured light pattern for camera-assisted planar homography transformation in accordance with example embodiments.

FIG. 8 is a diagram of a captured structured light pattern for camera-assisted planar homography transformation in accordance with example embodiments. For example, pattern 800 is a captured pattern (e.g., which is captured by a camera associated with projector for projecting the projected pattern 700) and includes nine elements (801, 802, 803, 804, 805, 806, 807, 808, and 809). The nine elements of captured pattern 800 are transformed from the position of corresponding elements of projected pattern 700 in accordance with a system geometry of a screen (e.g., sub-screen) non-orthogonal to the plane of projection.

The structured light pattern 700 is projected onto a screen and captured with the camera. The position (e.g., x, y in pixels) is determined for each corresponding detected centroids on the camera captured image. The centroids of the elements are determined using a single-pass connected components algorithm. Indices are matched to establish correspondence between corresponding centroids of both images.

The origin (e.g., x=0, y=0) is selected as the top left corner for coordinates of each of the nine centroids are stored in two vector arrays for determining a homography transformation matrix (discussed below with reference to Eqs. 35-46).

The structured light pattern projection, capture and centroids detection sequence serves at least two purposes: firstly, to establish the correspondence between the projected and camera-captured images (e.g., from which the homography between the projector and camera image planes are calculated); and secondly, to mark the ends of the construed line for detecting the bounds of the screen (discussed below with reference to FIGS. 11-16).

In addition to the structured (e.g., light) pattern 700 mentioned above, a solid (e.g., homogenous) field pattern is also projected and captured by the digital camera. The "solid" pattern is a homogenous field pattern for improving the contrast between the background projection surface and the target sub-screen facilitating the detection of the sub-screen boundaries. In an embodiment, the solid pattern is white, although other embodiments can use homogenous tones of substantially low frequency spatial arrangement (e.g., such the contrast between the background projection surface and the target sub-screen is detectable). However, the signal-to-noise ratio (SNR) of the captured structured light pattern is relatively greatly improved when using white solid field patterns. Selecting digital camera exposure parameters for the capture camera also increases the contrast between the background projection surface and the target sub-screen by reducing undesired effects such as brightness saturation.

Figure 9:
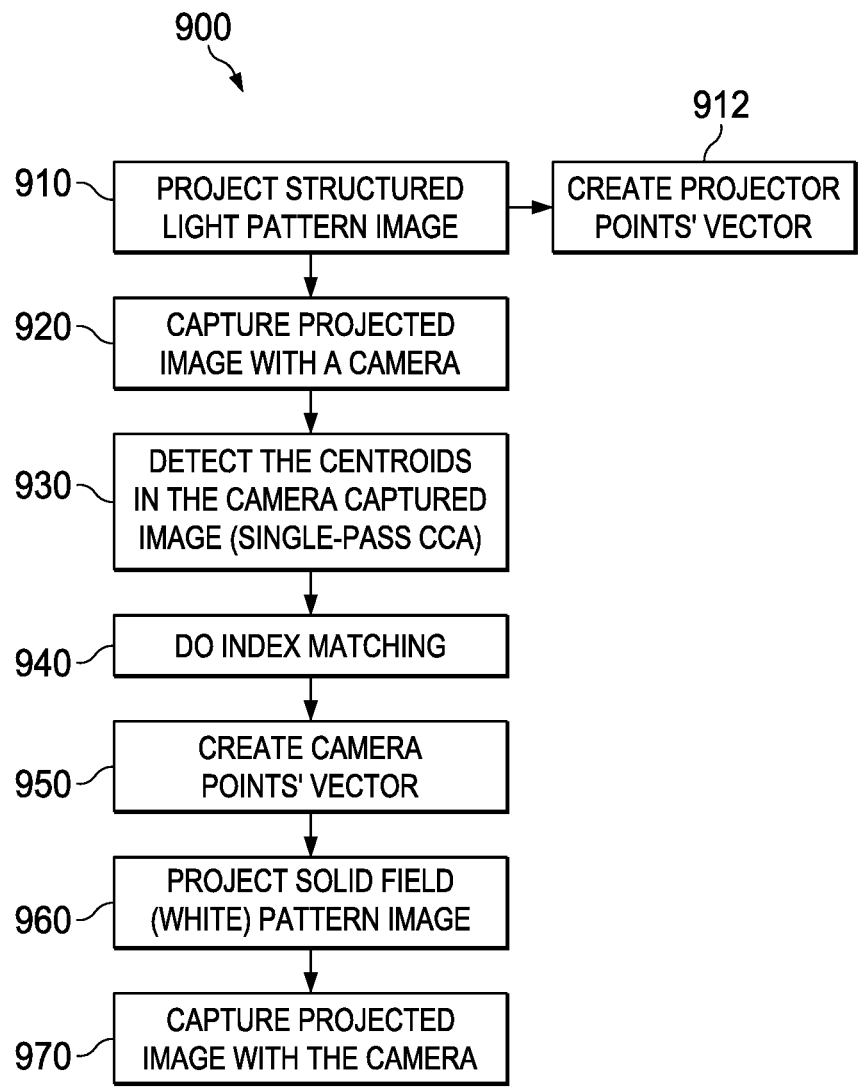
FIG. 9 is a flowchart of a process for processing structured and solid field patterns in accordance with example embodiments.

FIG. 9 is a flowchart of a process for processing structured and solid field patterns in accordance with example embodiments. For example, process flow 900 is a summary of the structured light and solid field pattern processing of operation 610. In operation 910, a structured light pattern image is projected. In operation 912, the projected (e.g., to-be-projected) the projector-points vector is created in response to the structured light pattern image. In operation 920, the projected structured light pattern image is captured by a camera, which generates the captured structured light pattern image in response. In operation 930, the single-pass CCA process detects the centroids of the captured structured light pattern image. In operation 940, index matching is performed to identify each pair of the centroid pairs occupying a single quadrant. In operation 950, the nine camera-point vectors is created in response to the identified centroid pairs of the captured structured light pattern image. In operation 960, the solid field (e.g., white) pattern image is projected (e.g., illuminating the same background over which the captured (e.g., structured light pattern) image was projected. In operation 970, the rejected solid field pattern image is captured by the camera, which generates the captured solid field pattern image. The process flow 900 is terminated such that processing continues in operation 620, described below.

As introduced above, one function of the structured light pattern processing is to establish the camera-projector point correspondences such that the planar homography between the camera and projector image planes can be numerically calculated. Because the described homography transformation operation assumes a planar perspective transformation, the described algorithm assumes that the background projection surface or screen and the target sub-screen are planar and smooth surfaces. (Other embodiments can use non-planar perspective transformation in accordance with various scaling and warping operations.)

To decrease the degree of error in the included numerical calculations, the exterior points (e.g., exterior to the sub-screen) in the structured light patterns for inclusion as vectors for establishing the correspondence between the camera and the projector image planes are projected onto a background projection surface (e.g., without being projected onto the target surface or sub-screen). The exterior points are projected onto the background projection surface because the described homography transformation assumes coplanar sampling points. Non-coplanar sample points (e.g., camera-projector correspondences) introduce errors in the calculations, which are propagated to subsequent blocks in the algorithm (e.g., leading to increasingly inaccurate results).

Figure 10:
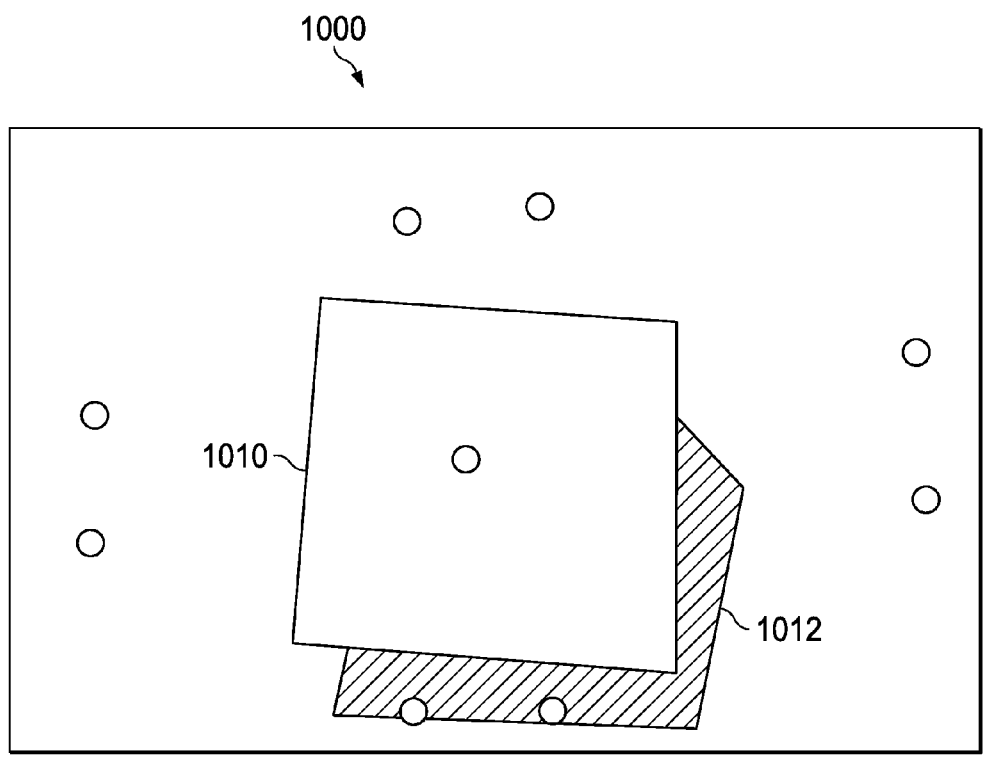
FIG. 10 is a diagram of a captured structured light pattern having non-coplanar sample points.

FIG. 10 is a diagram of a captured structured light pattern having non-coplanar sample points (e.g., centroid). The sub-screen 1010 is elevated with respect to background 1000 as evidenced by the shadow 1012 cast by sub-screen 1010 upon the background 1000. The center point (which being projected on sub-screen 1010 with respect to the background 1000) is not coplanar with the exterior points and is not used for the homography matrix calculations.

Referring again to FIG. 6, operation 620 is described. In operation 620, a homography is determined in response to an association between each selected point of the nine point projector-points vector with a corresponding selected point in the nine point the camera-points vector. The determined homography is represented in the in the form of a matrix equation for describing the geometric relationship between the camera image plane and the projector image plane (e.g., two different perspective planes). The homography matrix is a primary component of the homography transformation, which allows for perspective transformation between two image planes. Accordingly, two points in two different perspective planes are related by a homography.

In the case of a camera-projector system, a point in the projector perspective plane is correlated to its corresponding point in the camera perspective plane as follows:

$$\vec{P} = H\vec{C} \quad \text{(Eq. 1)}$$

where $\vec{P}$ is a scaled point in the projector plane, $\vec{C}$ is a point in the camera plane and H is the homography matrix that describes the correlation between the two planes. Eq. 1 can be also expressed as follows:

$$\begin{bmatrix} xw \\ yw \\ w \end{bmatrix} = \begin{bmatrix} p_1 & p_2 & p_3 \\ p_4 & p_5 & p_6 \\ p_7 & p_8 & p_9 \end{bmatrix} \begin{bmatrix} X \\ Y \\ 1 \end{bmatrix} \quad \text{(Eq. 2)}$$

The homography matrix is a square, 3×3 matrix, with components $p_1$ to $p_9$, where w is a scale factor. The projector point, (xw, yw, w) is represented in homogeneous coordinates. For a single camera point (X, Y, 1), the corresponding projector point is:

$$xw = p_1 X + p_2 Y + p_3 \quad \text{(Eq. 3)}$$

$$y = p_4 X + p_5 Y + p_6 \quad \text{(Eq. 4)}$$

$$w = p_7 X + p_8 Y + p_9 \quad \text{(Eq. 5)}$$

Assuming the following identities:

$$xw = \frac{xw}{w} \quad \text{(Eq. 6)}$$

$$yw = \frac{yw}{w} \quad \text{(Eq. 7)}$$

$$1 = \frac{w}{w} \quad \text{(Eq. 8)}$$

the scale factor w is "canceled" from the equations and the projector point can be expressed as a point in the 2-D projection image plane:

$$x = \frac{p_1 X + p_2 Y + p_3}{p_7 X + p_8 X + p_9} \quad \text{(Eq. 9)}$$

$$y = \frac{p_4 X + p_5 Y + p_6}{p_7 X + p_8 X + p_9} \quad \text{(Eq. 10)}$$

Eq. 9 and Eq. 10 are valid for a pair of points for which the homography matrix components are known. When the camera image plane has N points, and the projector plane has corresponding N points, the homography matrix can be determined as follows:

1. Consider a point pair, i, and accordingly rearrange terms in Eq. 9 and Eq. 10:

$$p_1 X_1 + p_2 Y_1 + p_3 - p_7 X_1 x_1 + p_8 Y_1 x_1 + p_9 x_1 = 0 \quad \text{(Eq. 11)}$$

$$p_4 X_1 + p_5 Y_1 + p_6 - p_7 X_1 y_1 + p_8 Y_1 y_1 + p_9 y_1 = 0 \quad \text{(Eq. 12)}$$

2. For a total of N point correspondences between the two planes, Eq. 11 and Eq. 12 can be expressed in matrix form:

$$\begin{bmatrix} X_1 & Y_1 & 1 & 0 & 0 & 0 & -X_1 x_1 & -Y_1 x_i & -x_1 \\ 0 & 0 & 0 & X_1 & Y_1 & 1 & -X_1 y_1 & -Y_1 y_1 & -y_1 \\ X_2 & Y_2 & 1 & 0 & 0 & 0 & -X_2 x_2 & -Y_2 x_2 & -x_2 \\ 0 & 0 & 0 & X_2 & Y_2 & 1 & -X_2 y_2 & -Y_2 y_2 & -y_2 \\ \vdots & \vdots & \vdots & \vdots & \vdots & \vdots & \vdots & \vdots & \vdots \\ X_{N-1} & Y_{N-1} & 1 & 0 & 0 & 0 & -X_{N-1} x_{N-1} & -Y_{N-1} x_{N-1} & -x_{N-1} \\ 0 & 0 & 0 & X_{N-1} & Y_{N-1} & 1 & -X_{N-1} y_{N-1} & -Y_{N-1} y_{N-1} & -y_{N-1} \\ X_N & Y_N & 1 & 0 & 0 & 0 & -X_N x_N & -Y_N x_N & -x_N \\ 0 & 0 & 0 & X_N & Y_N & 1 & -X_N y_N & -Y_N y_N & -y_N \end{bmatrix} \begin{bmatrix} p_1 \\ p_2 \\ p_3 \\ p_4 \\ p_5 \\ p_6 \\ p_7 \\ p_8 \\ p_9 \end{bmatrix} = 0 \quad \text{(Eq. 13)}$$

3. The system presented in Eq. 13 is a homogeneous system of linear equations. The Eq. 13 is overdetermined when N≥5:

$$A\vec{x}=0 \quad \text{(Eq. 14)}$$

where $\vec{x}=[p_1 \ldots p_p]$.

4. To find the non-trivial ($\vec{x} \neq 0$) solution of the system of linear equations in Eq. 13, the singular value decomposition (SVD) of matrix A is determined in accordance with:

$$\|A\vec{x}\|=\|UDV^T\vec{x}\| \quad \text{(Eq. 15)}$$

such that $\|\vec{x}\|=1$

Because U is orthogonal ($U^TU=UU^T=I$ and $U^T=U^{-1}$):

$$\|U\vec{p}\|=(\vec{p}\,U^TU\vec{p})^{1/2}=(\vec{p}^T\vec{p})^{1/2}=\|\vec{p}\| \quad (Eq.\ 16)$$

Accordingly:

$$\|A\vec{x}\|=\|UDV^T\vec{x}\|=\|DV^T\vec{x}\| \quad \text{(Eq. 17)}$$

$V^T$ is also orthogonal, which provides the following identities:

$$\|V^T\vec{x}\|=\|\vec{x}\| \text{ and } \|A\vec{x}\|=\|DV^T\vec{x}\| \text{ and } \|\vec{x}\|=1 \quad \text{(Eq. 18)}$$

Given the previously defined identities, the Eq. 13 and Eq. 14 are applied to determine:

$$\text{minimize } F=\|D\vec{y}\|$$

$$s.t.\,\|\vec{y}\|=1$$

where $y=V^T\vec{x}$. In this case, the matrix D is a diagonal matrix including entries arranged in descending order (e.g., $a_1 > a_2 > \ldots > a_n$):

$$D_{n \times n} \cdot \vec{y} = \begin{bmatrix} \alpha_1 & 0 & 0 & 0 & 0 & 0 \\ 0 & \alpha_2 & 0 & 0 & 0 & 0 \\ 0 & 0 & \alpha_3 & 0 & 0 & 0 \\ \vdots & \vdots & \vdots & \vdots & \vdots & \vdots \\ 0 & 0 & 0 & 0 & \vdots & 0 \\ 0 & 0 & 0 & 0 & 0 & \alpha_n \end{bmatrix} \begin{bmatrix} y_1 \\ y_2 \\ y_3 \\ \vdots \\ \vdots \\ y_n \end{bmatrix} \quad \text{(Eq. 19)}$$

Because $\|\vec{y}\|=1$, the minimal solution possible for this problem can be represented as:

$$\vec{y}=[0,0,0,\ldots,1]^T \quad \text{(Eq. 20)}$$

$$\vec{y}=V^T\vec{x} \quad \text{(Eq. 21)}$$

$$\vec{x}=V\vec{y} \quad \text{(Eq. 22)}$$

5. Accordingly, the solution to this problem is $\vec{x}$, the last column of V or the last row of $V^T$. And since $\vec{x}=[p_1 \ldots p_9]$, the homography matrix has been found:

$$H = \begin{bmatrix} p_1 & p_2 & p_3 \\ p_4 & p_5 & p_6 \\ p_7 & p_8 & p_9 \end{bmatrix} \quad \text{(Eq. 23)}$$

Referring again to FIG. 6, operation 630 is described. In operation 630, the bounds of the sub-screen are detected. For example, operation 630 includes an algorithm for detecting or identify boundaries or edges of a target screen. For identifying sub-screen bounds, the sub-screen boundaries in a captured-picture frame are determined by tracking (e.g., construed) lines joining selected centroids of the structured light pattern elements using a selected-threshold adaptive line tracking algorithm. As described above, the centroids of the camera-captured structured light pattern elements are construed to as the endpoints of the tracked lines. However, information for delineating the sub-screen information is generated from the captured solid field pattern.

The algorithm for detecting or identify boundaries or edges of a target screen operates in accordance with the principle that one line (e.g., an imaginary line) is construed between the centroids of two structured light pattern elements (e.g., each centroid of which is located on opposite sides within the camera image frame). The construed line is tracked and changes in pixel values (luminance, hue or saturation) are calculated. By determining abrupt changes in pixel values for adjacent pixel locations along the construed line in the captured-picture frame, the boundary pixel locations are determined and are stored in memory. At least two intersection points can define a single sub-screen boundary. Accordingly, eight (two per construed line) or more structured light pattern elements (plus one central element for alignment purposes) are included in the structure light pattern image for projecting.

Figure 11:
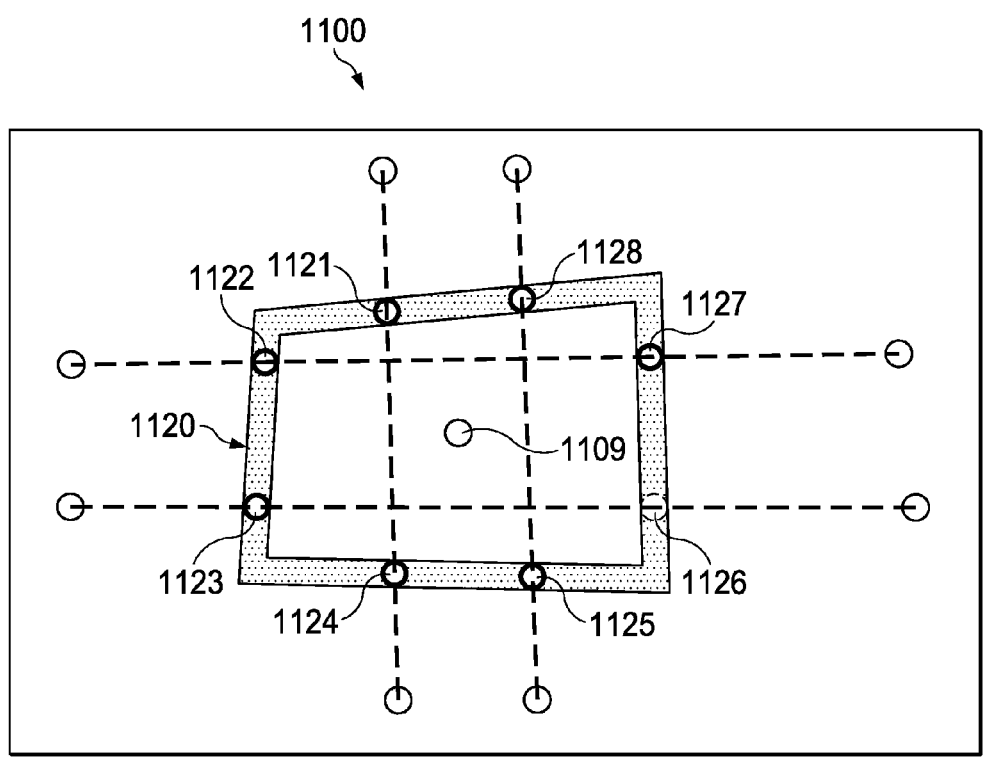
FIG. 11 is a diagram of a construed lines in a captured structured light pattern image for camera-assisted planar homography transformation in accordance with example embodiments.

FIG. 11 is a diagram of a construed lines in a captured structured light pattern image for camera-assisted planar homography transformation in accordance with example embodiments. The construed lines join centroid pairs of opposing structured light elements of the captured structured light pattern image 1100. Intersection points are abrupt changes in the pixel values, which occur along the construed lines at points 1121, 1122, 1123, 1124, 1125, 1126, 1127, and 1128 (e.g., whenever the construed lines intersect with the boundaries of the sub-screen 1120). At least two detected intersection points are used to properly identify an edge (one of the four edges of the quadrilateral outline) of a sub-screen.

Generally, sub-screens are detectable when each of the four sides are included within a quadrilateral defined by the endpoints of the construed lines and each of the four sides are also defined by the detected intersection points. For example, sub-screens are detectable when each of the four sides are smaller than the quadrilateral formed by joining the exterior structured light pattern elements (exterior quadrilateral) and are larger than the quadrilateral formed by joining the intersection points of the construed lines (the interior quadrilateral). Also, the (e.g., entire) interior quadrilateral is placed inside of the target sub-screen, which helps ensure each of the four edges of the sub-screen is detected. Available locations for sub-screen sizing and placement is discussed below with respect to FIG. 12.

Figure 12:
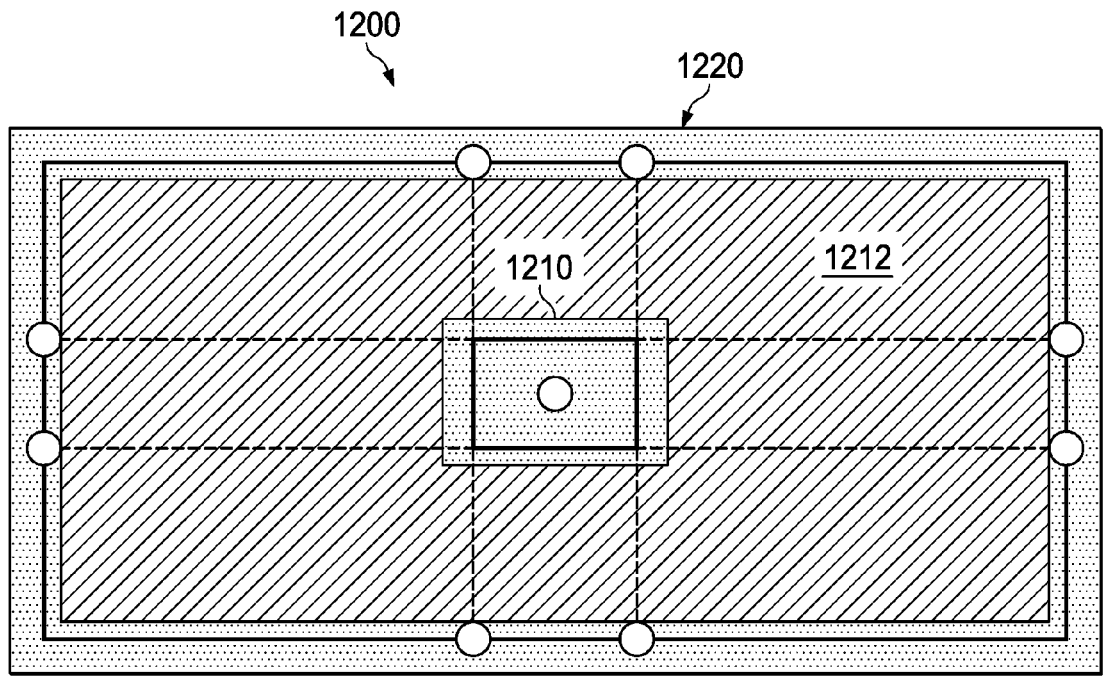
FIG. 12 is diagram of available locations for sub-screen sizing and placement in accordance with example embodiments.

FIG. 12 is diagram of available locations for sub-screen sizing and placement in accordance with example embodiments. Diagram 1200 includes an outer quadrilateral 1220 (which includes endpoints of the construed lines), an inner quadrilateral (which is defined by intersections of the construed lines), and an area 1212 (an area between the outer quadrilateral 1220 and the inner quadrilateral 1210. Accordingly, edges of the target sub-screen with the area 1212 are detectable, which limits on the sub-screen sizing in the described embodiment.

As discussed above, each construed line is tracked (e.g., evaluated) for changes in pixel values (e.g., luminance, hue and saturation) and the pixel positions are stored at which abrupt changes in the pixel values occur. Changes in pixel values can be calculated using a threshold adaptive algorithm in which the mean noise level (e.g., based on a specific pixel value metric) is determined. Such changes are identified as a function of the determined mean noise level. The threshold adaptive algorithm helps ensure the proper identification of screen boundaries over a wide range of ambient light conditions. The mean noise level can be defined as:

$$\mu = \frac{1}{N} \sum_{n=0}^{N-1} \Delta V_n \quad \text{(Eq. 24)}$$

$$\Delta V_n = V_{n+1} - V_n \quad \text{(Eq. 25)}$$

where $V_n$ is the pixel value at the current pixel position, $\Delta V_n$ is the $n^{th}$ pixel value change (change in luminance, saturation or hue) and N is the total number of points analyzed in the current line. The standard deviation of the pixel value metric is calculated in accordance with Eq. 24 as follows:

$$\sigma = \sqrt{\frac{1}{N} \sum_{n=0}^{N-1} (\Delta V_n - \mu)^2} \quad \text{(Eq. 26)}$$

Equations 24, 25 and 26 form a basis for the threshold adaptive algorithm. Each line of the construed lines includes a (e.g., unique) "(v, σ)" metric determined in response to local conditions (e.g., in which one side of the screen might be more illuminated than the other). A dynamic threshold can be determined in response to the (μ, σ) metric:

$$Th = K\sigma \quad \text{(Eq. 27)}$$

Figure 13:
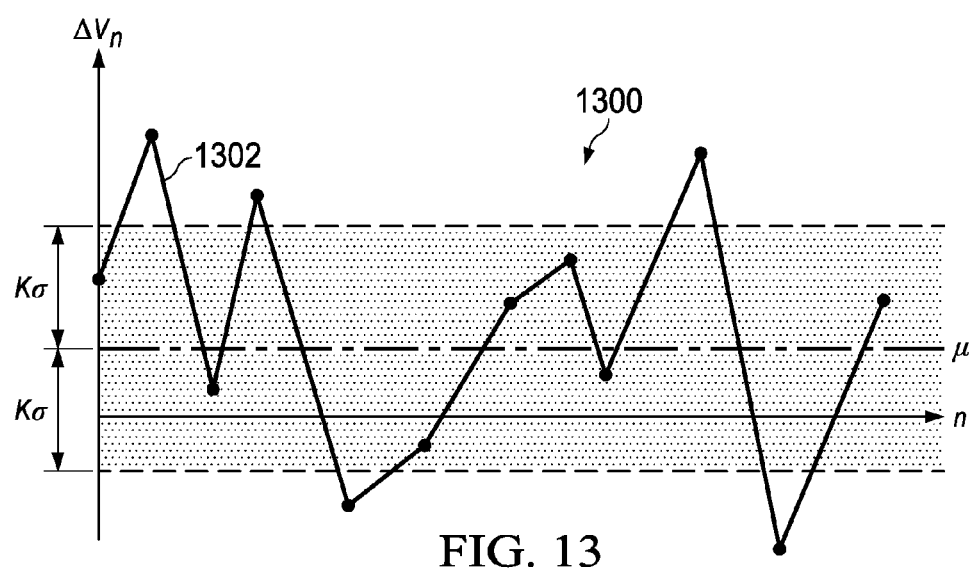
FIG. 13 is diagram of dynamically thresholded adjacent pixel delta values in a construed line in accordance with example embodiments.

FIG. 13 is diagram of dynamically thresholded adjacent pixel delta values in a construed line in accordance with example embodiments. For example, diagram 1300 the pixels in which abs($\Delta V_n$)>Th are considered to have an abrupt change in value and are accordingly considered to be candidates for points along a screen edge.

The positions of the pixels (e.g., 1302) for which $\Delta V_n$ is outside of the threshold area (e.g., defined by Kσ) are considered to be intersection points between the construed lines and the edges of the sub-screen. While the structured light pattern processing helps define the position and orientation of the construed lines, the solid white field pattern provides the actual pixel value information used when tracking $\Delta V_n$ of pixels lying within the construed lines. Projecting "full-on" (e.g., no-color) white solid fields increases the contrast between the background projection surface and the target sub-screen boundaries and enhances screen edge detection accuracy. An example of a white solid field projected onto a target sub-screen is discussed below with respect to FIG. 14.

Figure 14:
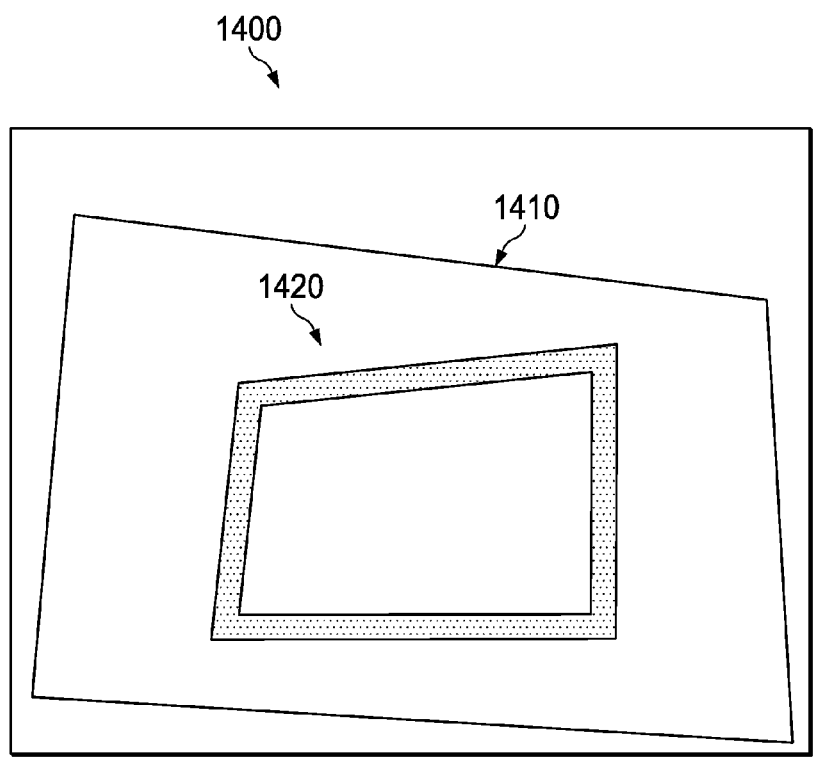
FIG. 14 is captured image of a target sub-screen illuminated by a projected white solid field in accordance with example embodiments.

FIG. 14 is captured image of a target sub-screen illuminated by a projected white solid field in accordance with example embodiments. For example, image 1400 includes target sub-screen 1420 illuminated by a projected white solid field 1410. As described above, two or more intersection points identify a sub-screen edge. Accordingly, the equation of the line describing an edge of the target sub-screen can be defined by two intersection points:

$$m_e = \frac{y_{int2} - y_{int1}}{x_{int2} - x_{int1}} \quad \text{(Eq. 28)}$$

$$b_e = y_{int\,1} - m_e x_{int\,1} \quad \text{(Eq. 29)}$$

$$y_e = m_e x_e + b_e \quad \text{(Eq. 30)}$$

where $m_e$ is the slope of a selected sub-screen edge, $y_{int\,2}$ is the second intersection y-coordinate, $y_{int\,1}$ is the first intersection y-coordinate, $x_{int\,2}$ is the second intersection x-coordinate, $x_{int\,1}$ is the first intersection x-coordinate, $b_e$ is the y-intercept of the edge, $y_e$ is a y-coordinate of the edge, and $x_e$ is an x-coordinate of the edge.

When tracking a construed line, more than one intersection point may be encountered between the construed line and the same sub-screen edge. Because a single intersection point is defined, three embodiments are described for resolving ambiguities in a captured solid field pattern: in a first (e.g., average) embodiment, the average of all of the found intersections points is calculated (for example, the line describing the screen edge passes through the middle of the sub-screen edge); in a second (e.g., outermost) embodiment, the outermost intersection point is selected, in which the line describing the sub-screen edge passes through the exterior bounds of the sub-screen; in a third (e.g., innermost) embodiment, the innermost intersection point is selected, in which the line describing the sub-screen edge passes through the interior bounds of the sub-screen.

Figure 15:
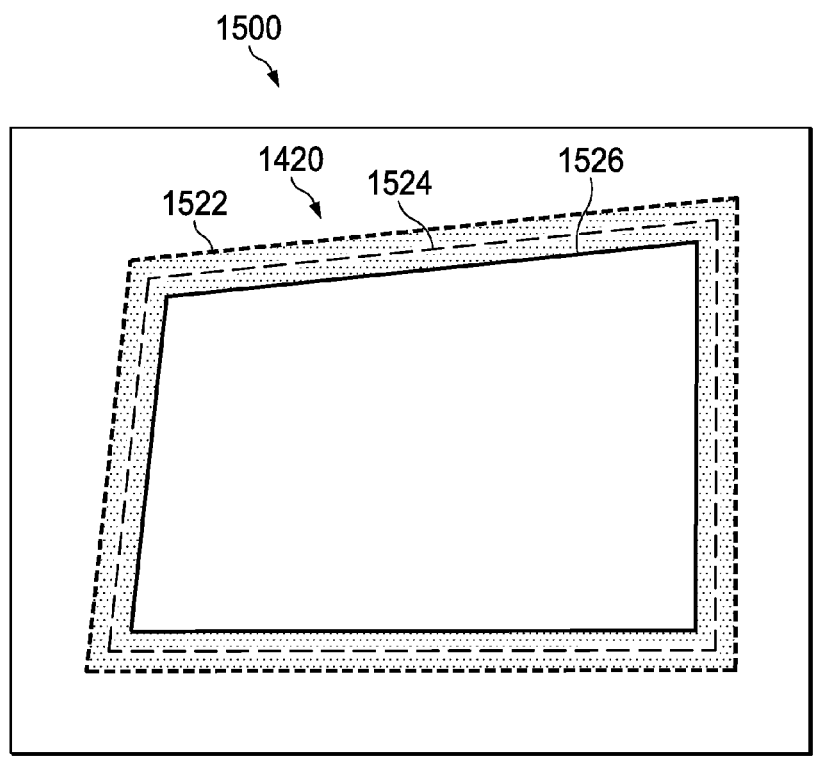
FIG. 15 is a captured image of an illuminated target sub-screen in accordance with example embodiments.

FIG. 15 is a captured image of an illuminated target sub-screen in accordance with example embodiments. For example, image 1500 includes target sub-screen 1420 for which an average sub-screen bounds 1524, an outermost sub-screen bounds 1524, and an innermost sub-screen bounds 1524 are determined (e.g., each of the four sub-screen edges for the determined bounds is processed in accordance with a selected one of the average embodiment, the outermost embodiment, and the innermost embodiment.) Accordingly, only one point can be processed when more than one intersection point is detected between an construed line and a sub-screen edge. Depending the selected embodiment (average, outermost or innermost), the image for projecting into the sub-screen is transformed (described below) and fitted to the inner or outer bounds, or points there between.

The described process for sub-screen boundary detection is described with respect to the identification of bounds of rectangular screens, but other geometric shapes of screens are possible. As described herein, detection of arbitrary sub-screen bounds can be detect when the sub-screen is discernible from the background surface (e.g., where the exterior structured light elements are projected). Accordingly, sub-screens not lying in the same screen as the background screen—and sub-screens protruding from the background screen—can be detected provided the respective boundaries are discernible from the background.

Although the detected intersection points provide for the characterization of the target sub-screen edges (e.g., represented by line equations), the four-corner model of the two-dimensional correction engine accepts the related input as "corners" of a quadrilateral (e.g., sub-screen) in which the corrected image is to be projected. Accordingly, the intersection points defined by the construed lines characterize the existing sub-screen edges. When a screen is not detected (e.g., no intersection points between two construed lines and a sub-screen edge are found), a missing boundary edge can still be determined. missing edges can be determined by characterizing the missing edge as a respective edge of the original projected image, such that the four intersection points (the corners of a quadrilateral) can be calculated. Accordingly, the described process for subs-screen boundary detection accomplishes fitting to incomplete screens (missing edges) as accurately as possible.

Figure 16:
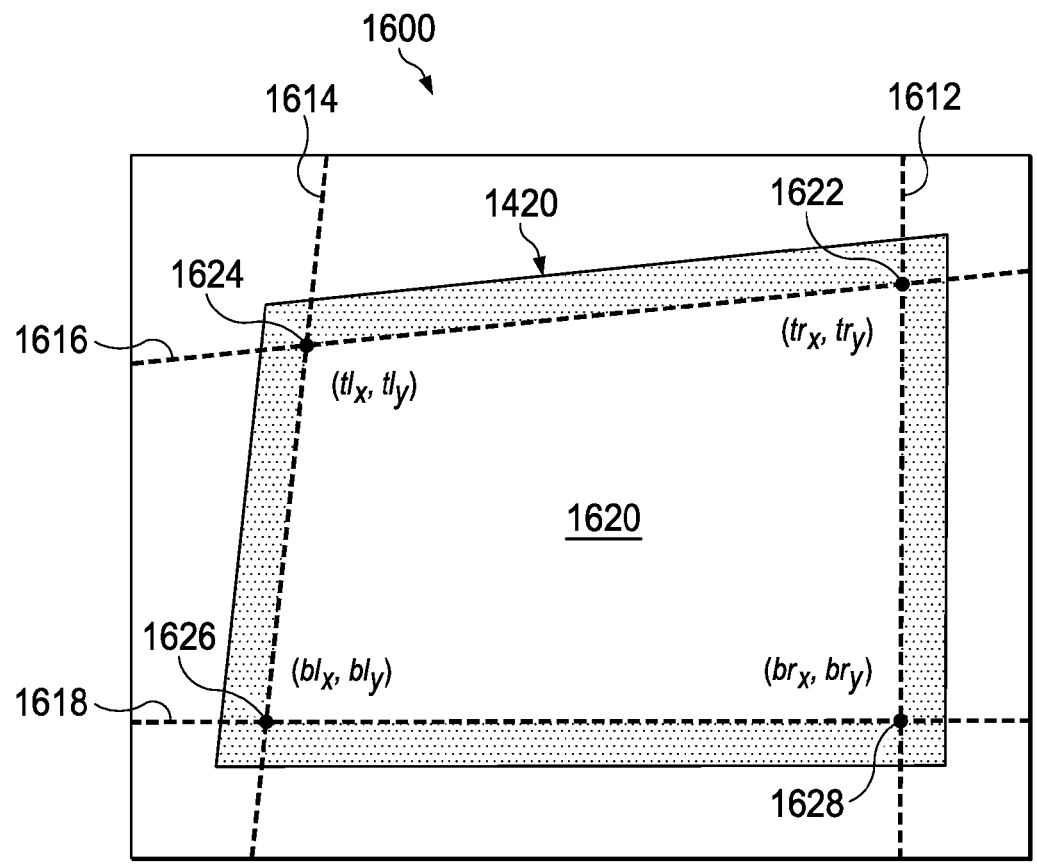
FIG. 16 is a captured image of an illuminated target sub-screen for which the four corners are determined in the camera perspective plane in accordance with example embodiments.

FIG. 16 is a captured image of an illuminated target sub-screen for which the four corners are determined in the camera perspective plane in accordance with example embodiments. For example, the intersections of each of the four line equations for each of the four sub-screen edges (1612, 1614, 1616, and 1618) of sub-screen 1420 define four (top-right 1622, top-left 1624, bottom-left 1626, and bottom-right 1628) corners of the sub-screen 1620. The four (top-right 1622, top-left 1624, bottom-left 1626, and bottom-right 1628) points indicate the four (e.g., determined) corners of the target sub-screen in the camera perspective plane.

Referring again to FIG. 6, operation 640 is described. In operation 640, the identified bounds of the sub-screen (e.g., determined corners) are transformed in accordance with planar homography. The determined corners (including corners for incomplete sub-screens) are transformed in from the camera perspective plane to the projected perspective plane as described in the following equations. The four corners of the target sub-screen in the camera perspective plane are:

Top Left→$(tl_x, tl_y)$ (Eq. 31)

Top Right→$(tr_x, tr_y)$ (Eq. 32)

Bottom Right→$(br_x, br_y)$ (Eq. 33)

Bottom Left→$(bl_x, bl_y)$ (Eq. 34)

The four corners can be expressed as vectors in homogeneous coordinates:

$$\vec{TL}_{cam} = \begin{bmatrix} tl_x \\ tl_y \\ 1 \end{bmatrix} \quad \text{(Eq. 35)}$$

$$\vec{TR}_{cam} = \begin{bmatrix} tr_x \\ tr_y \\ 1 \end{bmatrix} \quad \text{(Eq. 36)}$$

$$\vec{BR}_{cam} = \begin{bmatrix} br_x \\ br_y \\ 1 \end{bmatrix} \quad \text{(Eq. 37)}$$

$$\vec{BL}_{cam} = \begin{bmatrix} bl_x \\ bl_y \\ 1 \end{bmatrix} \quad \text{(Eq. 38)}$$

The corresponding sub-screen corners in the projector perspective plane can be found using Eq. 1 and the homography matrix:

$$\vec{TL}_{proj*} = \begin{bmatrix} p_1 & p_2 & p_3 \\ p_4 & p_5 & p_6 \\ p_7 & p_8 & p_9 \end{bmatrix} \begin{bmatrix} tl_x \\ tl_y \\ 1 \end{bmatrix} = H\vec{TL}_{cam} = \begin{bmatrix} tl_{proj,x*} \\ tl_{proj,y*} \\ tl_{proj,z*} \end{bmatrix} \quad \text{(Eq. 39)}$$

$$\vec{TR}_{proj*} = \begin{bmatrix} p_1 & p_2 & p_3 \\ p_4 & p_5 & p_6 \\ p_7 & p_8 & p_9 \end{bmatrix} \begin{bmatrix} tr_x \\ tr_y \\ 1 \end{bmatrix} = H\vec{TR}_{cam} = \begin{bmatrix} tr_{proj,x*} \\ tr_{proj,y*} \\ tr_{proj,z*} \end{bmatrix} \quad \text{(Eq. 40)}$$

$$\vec{BR}_{proj*} = \begin{bmatrix} p_1 & p_2 & p_3 \\ p_4 & p_5 & p_6 \\ p_7 & p_8 & p_9 \end{bmatrix} \begin{bmatrix} br_x \\ br_y \\ 1 \end{bmatrix} = H\vec{BR}_{cam} = \begin{bmatrix} br_{proj,x*} \\ br_{proj,y*} \\ br_{proj,z*} \end{bmatrix} \quad \text{(Eq. 41)}$$

$$\vec{BL}_{proj*} = \begin{bmatrix} p_1 & p_2 & p_3 \\ p_4 & p_5 & p_6 \\ p_7 & p_8 & p_9 \end{bmatrix} \begin{bmatrix} bl_x \\ bl_y \\ 1 \end{bmatrix} = H\vec{BL}_{cam} = \begin{bmatrix} bl_{proj,x*} \\ bl_{proj,y*} \\ bl_{proj,z*} \end{bmatrix} \quad \text{(Eq. 42)}$$

In accordance with Eq. 2 through Eq. 8, the resulting corners are scaled. The final corner coordinates represented in the projector perspective plane are:

$$\vec{TL}_{proj} = \begin{bmatrix} \frac{\vec{TL}_{proj,x*}}{\vec{TL}_{proj,z*}} \\ \frac{\vec{TL}_{proj,y*}}{\vec{TL}_{proj,z*}} \\ \frac{\vec{TL}_{proj,z*}}{\vec{TL}_{proj,z*}} \end{bmatrix} = \begin{bmatrix} \vec{TL}_{proj,x} \\ \vec{TL}_{proj,y} \\ 1 \end{bmatrix} \quad \text{(Eq. 43)}$$

$$\vec{TR}_{proj} = \begin{bmatrix} \frac{\vec{TR}_{proj,x*}}{\vec{TR}_{proj,z*}} \\ \frac{\vec{TR}_{proj,y*}}{\vec{TR}_{proj,z*}} \\ \frac{\vec{TR}_{proj,z*}}{\vec{TR}_{proj,z*}} \end{bmatrix} = \begin{bmatrix} \vec{TR}_{proj,x} \\ \vec{TR}_{proj,y} \\ 1 \end{bmatrix} \quad \text{(Eq. 44)}$$

$$\vec{BR}_{proj} = \begin{bmatrix} \frac{\vec{BR}_{proj,x*}}{\vec{BR}_{proj,z*}} \\ \frac{\vec{BR}_{proj,y*}}{\vec{BR}_{proj,z*}} \\ \frac{\vec{BR}_{proj,z*}}{\vec{BR}_{proj,z*}} \end{bmatrix} = \begin{bmatrix} \vec{BR}_{proj,x} \\ \vec{BR}_{proj,y} \\ 1 \end{bmatrix} \quad \text{(Eq. 45)}$$

$$\vec{BL}_{proj} = \begin{bmatrix} \frac{\vec{BL}_{proj,x*}}{\vec{BL}_{proj,z*}} \\ \frac{\vec{BL}_{proj,y*}}{\vec{BL}_{proj,z*}} \\ \frac{\vec{BL}_{proj,z*}}{\vec{BL}_{proj,z*}} \end{bmatrix} = \begin{bmatrix} \vec{BL}_{proj,x} \\ \vec{BL}_{proj,y} \\ 1 \end{bmatrix} \quad \text{(Eq. 46)}$$

These corners (e.g., of the sub-screen edges transformed to the projector perspective plane) are provided to the input to the two-dimensional correction engine in accordance with the four-corner adjustment user model.

Figure 17:
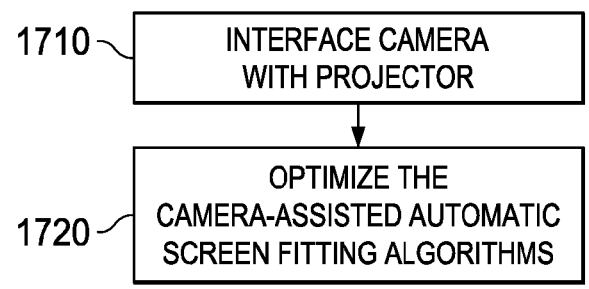
FIG. 17 is a flowchart of a process for implementing camera-assisted planar homography transformation of sub-screen coordinates in accordance with example embodiments.

FIG. 17 is a flowchart of a process for implementing camera-assisted planar homography transformation of sub-screen coordinates in accordance with example embodiments.

In operation 1710, a camera is interfaced with a projector. In an embodiment, the selected camera has an output format of the 8-bit YUV 422 standard. The selected camera outputs captured images at 30 frames per second. The camera output is captured and processed within a DLP® ASIC or an external processor (or FPGA) arranged for capturing and processing an image (e.g., frame) output from the camera. When using an external processor, the synchronization between ASIC and external processor becomes a complex situation and increases the cost of the solution. Accordingly, interfacing the camera directly to the DLP® ASIC, provides a cost-effective and less complex solution. The DLP® ASIC has an input port for accepting 30-bit data (e.g., 10-bit A, B, C channels). Further, the selected ASIC is designed to process RGB444 or YUV422 data on the ABC channels. The camera has 8-bit YUV422 on a single channel.

In the embodiment, the 8 bit output from the camera is interfaced to a selected one of the A, B and C channels. The ASIC is configured to treat the sourced data as RGB data input on the selected channel. Accordingly, the source data passes through the ASIC without modification (e.g., which increases data rate capacities and reduces power consumed). Frame data is stored in internal memory (e.g., low-level cache) in preparation for increased-speed frame rate conversion.

After a camera-source image frame data is stored, embedded software processes data containing frame information. For example, when the camera output is coupled to the A channel, the data written to memory is written iteratively in patterns such as 8-bit Y (from channel A), 0 (from channel B) and 0 (from channel C), 8-bit U (from channel A), 0 (from channel B) and 0 (from channel C), 8-bit Y (from channel A), 0 (from channel B) and 0 (from channel C), 8-bit V (from channel A), 0 (from channel B) and 0 (from channel C). Such patterns can be represented in a stream format such as:

{0xY1, 0x00, 0x00, 0xU1, 0x00, 0x00, 0xY2, 0x00, 0x00, 0xV2, 0x00, 0x00, 0xY3, 0x00, 0x00, 0xU3, 0x00, 0x00, 0xY4, 0x00, 0x00, 0xV4, 0x00, 0x00}

The embedded software processes bytes including useful information. To process the luminance portion of the signal, the Y components are selected (by skipping next six bytes). Accordingly, data from the camera is transferred to the DLP® ASIC internal memory in less than $1160^{th}$ of a second.

In operation 1720, the camera-assisted screen fitting algorithms are optimized. Optimizing the described process into an embedded environment includes image data management and customizing of software for efficient execution in a multilevel cache environment. For example, image data is managed by writing image data directly to internal ASIC memory, where the selected ASIC processor can access image data from internal memory sequentially to calculate centroids by accessing low-latency L1/L2 caches included in the ASIC memory system. The software is customized in accordance with various operations described hereinbelow with respect to FIG. 18.

Figure 18:
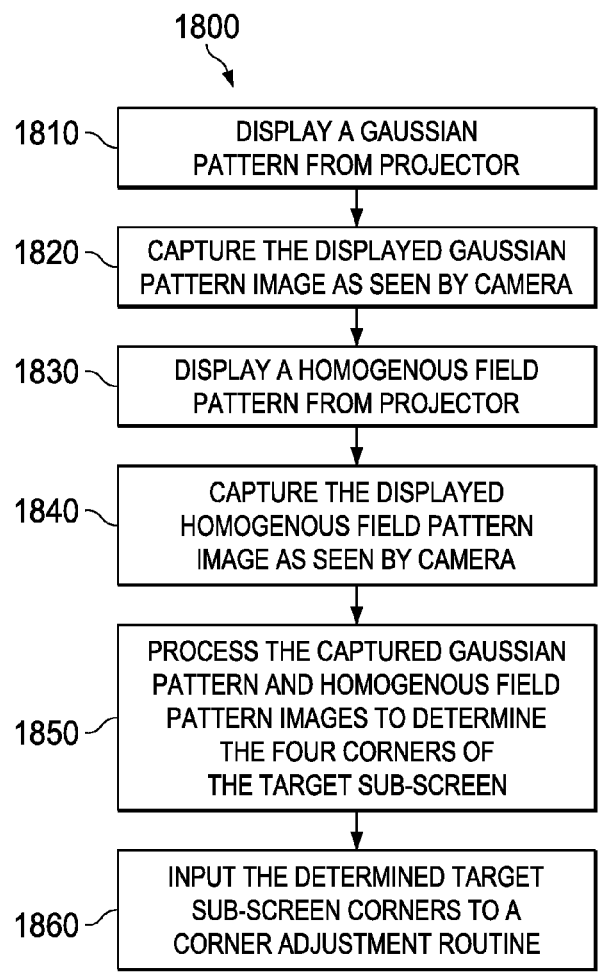
FIG. 18 is a flowchart of a process for automatic screen fitting in accordance with example embodiments.

FIG. 18 is a flowchart of a process for automatic screen fitting in accordance with example embodiments. In operation 1810, a frame including Gaussian patterns is projected by the DLP® projector. For example, the Gaussian pattern image can be structured light patterns with sparse elements (e.g., two dimensional Gaussian patterns or circles) for establishing a correspondence between a projected and captured image (e.g., frame). Performance-degrading delays are minimized between the operation for displaying the patterns and the operation for setting up the camera to capture the image. Both patterns are stored as logo images. Each pattern is displayed on a screen (e.g., a wall having one or more sub-screens) and the display is frozen (e.g., by projecting the same frame over many frame cycles).

In operation 1820, the displayed Gaussian pattern image as viewed (e.g., "seen") by the camera is captured. For example: the camera transfers the captured image data to the ASIC memory for processing.

In operation 1830, a homogenous pattern (e.g., solid field) is displayed from the projector. For example, performance-degrading delays are minimized between the operation for displaying the patterns and the operation for setting up the camera to capture the image. Both patterns are stored as logo images. Each pattern is displayed on the wall and display is frozen.

In operation 1840, the displayed homogenous pattern image as viewed by the camera is captured. For example, the camera transfers the captured image data to the ASIC memory for processing.

In operation 1850, the captured Gaussian pattern and homogenous field pattern images are processed to determine the four corners of the target sub-screen. Embedded software separates luminance values from chrominance and saves luminance values for further processing. The code for the embedded software is computational intensive with many matrix multiplication operations. Intermediate values in the computation are stored in stacked DRAM. Variables are reused between various operations. Bitwise shift operations are employed for fast integer multiplication and division operations. Loops are merged to initialize and reduce complexity of computations. Such code optimization for calculating sub-screen corners in the projector image plane provides sufficient performance to provide a user with a satisfactory user experience (e.g., in the time taken to install a projector in accordance with described embodiments).

In operation 1860, the determined target sub-screen corners are input to a corner adjustment routine. When the adjusted image's corners (e.g., in the projected perspective plane) are determined, they are used by the user-input corner adjustment user model and the projected image is fitted to the sub-screen. When keystone distortion occurs as a result of the axis of projection of the projector not being orthogonal to the screen, the keystone distortion is corrected-for implicitly when the projected image is fitted to the target sub-screen.

Figure 19:
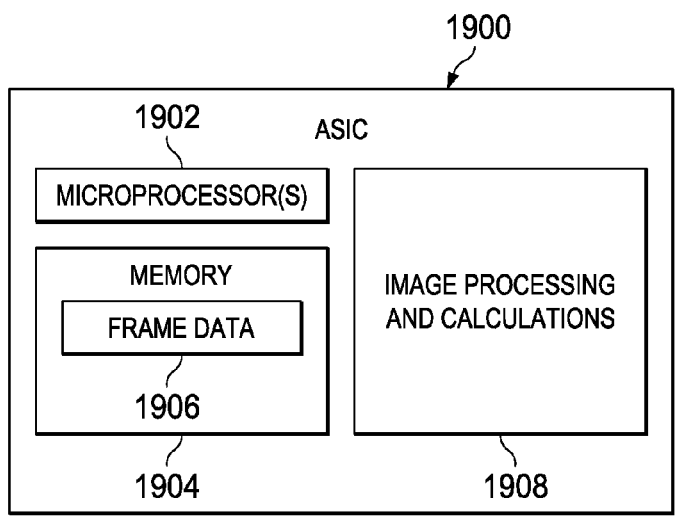
FIG. 19 is a high-level block diagram of an IC 1900 in accordance with example embodiments.

FIG. 19 is a high-level block diagram of an IC 1900 in accordance with example embodiments. IC 1900 contains Microprocessors 1902 and a Memory 1904, in which the frame data 1906 described above is stored. Memory 1904 can include Read-Only-Memory (ROM), Random Access Memory (RAM), Electrically Erasable Programmable Read-Only Memory (EEPROM), and flash memory. IC 1900 also includes an Image Processing and Calculations module 1908. Image Processing and Calculations module 1908 is designed to perform the methods of determining the pitch and yaw offset angles as described herein. IC 1900 can be an application specific integrated circuit (ASIC), a system-on-chip (SoC) circuit, and a field-programmable gate array (FPGA).

Modifications are possible in the described embodiments, and other embodiments are possible, within the scope of the claims.

What is claimed is:

1. A method comprising:
   projecting solid field patterns onto screens via at least one projector, wherein the screens include user-defined sub-screens;
   image capturing the projected solid field patterns as imaged solid patterns via at least one camera;
   for camera perspective planes of the at least one camera, determining first corner coordinates of the sub-screens, based on differences in pixel values of the imaged solid patterns;
   determining homography matrices associated with the camera perspective planes and associated with projector perspective planes of the at least one projector;

for the projector perspective planes, transforming the first corner coordinates to second corner coordinates of the sub-screens, based on the homography matrices; and projecting images based on the second corner coordinates.

2. The method of claim 1, wherein projecting the solid field patterns comprises:

projecting the solid field patterns to increase contrast between background projection surfaces of the screens and target surfaces of the sub-screens.

3. The method of claim 1, wherein image capturing the projected solid field patterns comprises:

image capturing at exposure levels to avoid brightness saturation of the imaged solid patterns.

4. The method of claim 1, wherein the at least one camera includes first cameras, and wherein determining the first corner coordinates comprises:

projecting structured light patterns having centroids onto the screens via the at least one projector;

image capturing the projected structured light patterns as imaged structured patterns via second cameras; and along paths between centroids of the imaged structured patterns, determining pixel positions at which a difference between pixel values of adjacent pixels exceeds a threshold value.

5. The method of claim 4, wherein the paths are linear.

6. The method of claim 4, wherein the pixel values include at least one of: luminance, hue and saturation values.

7. The method of claim 4, wherein the paths are based on threshold adaptive line tracking.

8. The method of claim 7, wherein boundaries of the paths are tracked based on threshold adaptive line tracking.

9. The method of claim 1, wherein the at least one cameras are first camera, and wherein determining the homography matrices comprises:

projecting structured light patterns having centroids onto the screens via the at least one projector;

image capturing the projected structured light patterns as imaged structured patterns via second cameras; and determining the homography matrices based on: the centroids of the projected structured light patterns; and centroids of the imaged structured patterns.

10. The method of claim 9, wherein determining the homography matrices comprises:

expressing the centroids of the projected structured light patterns as scaled points on the projector perspective planes; and expressing the centroids of the imaged structured patterns as scaled points on the camera perspective planes.

11. The method of claim 9, wherein determining the homography matrices comprises:

matching indices geometrically through allocating quadrants for the centroids on a one-to-one basis.

12. The method of claim 9, wherein determining the homography matrices comprises:

pairing the centroids of the projected structured light patterns with the centroids of the imaged structured patterns.

13. The method of claim 1, wherein transforming the first corner coordinates to the second corner coordinates comprises:

expressing the first corner coordinates as four homogeneous coordinate vectors for four corners of one of the sub-screens.

14. The method of claim 1, wherein transforming the first corner coordinates to the second corner coordinates comprises:

processing the homography matrices using processors; and projecting the solid field patterns as processed by the processors.

15. A method comprising:

image capturing one or more projected solid field patterns as one or more imaged solid patterns via one or more cameras;

for one or more camera perspective planes of the one or more cameras, determining first corner coordinates of user-defined sub-screens, based on differences in pixel values of the one or more imaged solid patterns;

determining homography matrices associated with the one or more camera perspective planes and associated with one or more projector perspective planes of one or more projectors;

for the one or more projector perspective planes, transforming the first corner coordinates to second corner coordinates of the sub-screens, based on the homography matrices; and projecting images based on the second corner coordinates.

16. The method of claim 15, wherein image capturing the one or more projected solid field patterns comprises:

image capturing at exposure levels to avoid brightness saturation of the imaged solid patterns.

17. The method of claim 15, wherein image capturing the one or more projected solid field patterns comprises:

projecting the one or more solid field patterns onto screens via the one or more projectors, wherein the screens include the user-defined sub-screens.

18. Apparatus comprising:

a projector to project solid field patterns onto a screen, wherein the screen includes user-defined sub-screens;

a camera to image capture the projected solid field patterns as imaged solid patterns; and a processor to: for a camera perspective plane of the camera, determine first corner coordinates of the sub-screens, based on differences in pixel values of the imaged solid patterns; determine a homography matrix associated with the camera perspective plane and associated with a projector perspective plane of the projector; and, for the projector perspective plane, transform the first corner coordinates to second corner coordinates of the sub-screens, based on the homography matrix.

19. The apparatus of claim 18, wherein the projector is to project images based on the second corner coordinates.

20. The apparatus of claim 18, further comprising: a user-actuated button to initiate determining of the first corner coordinates.

* * * * *